Feb. 5, 1929.
F. T. McCAHILL
1,701,383
CONVERTIBLE GLARE AND AUXILIARY WINDSHIELD
Filed Jan. 24, 1927     2 Sheets-Sheet 1
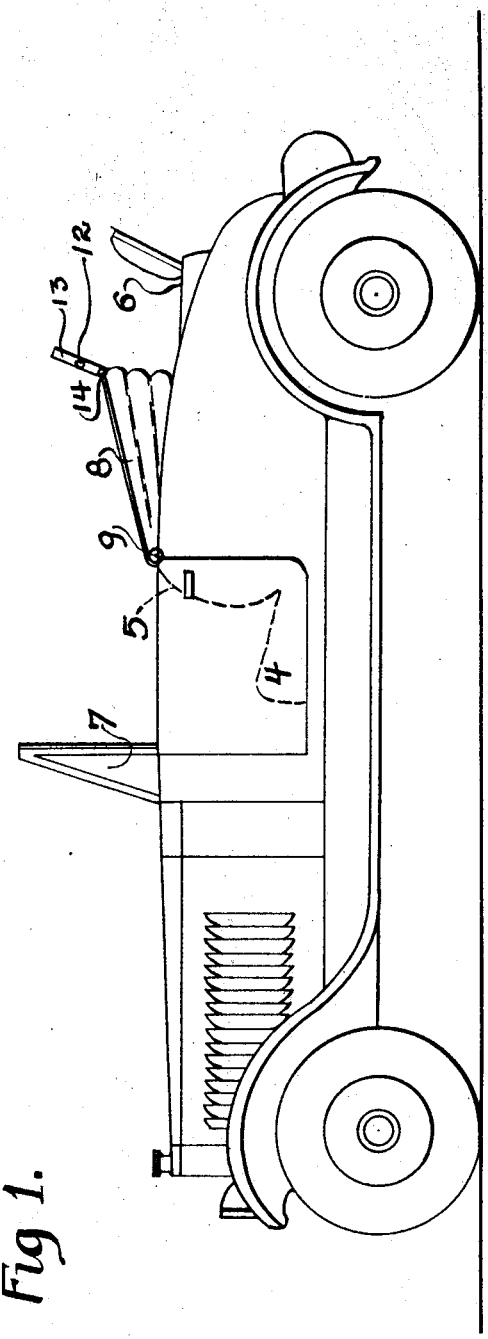
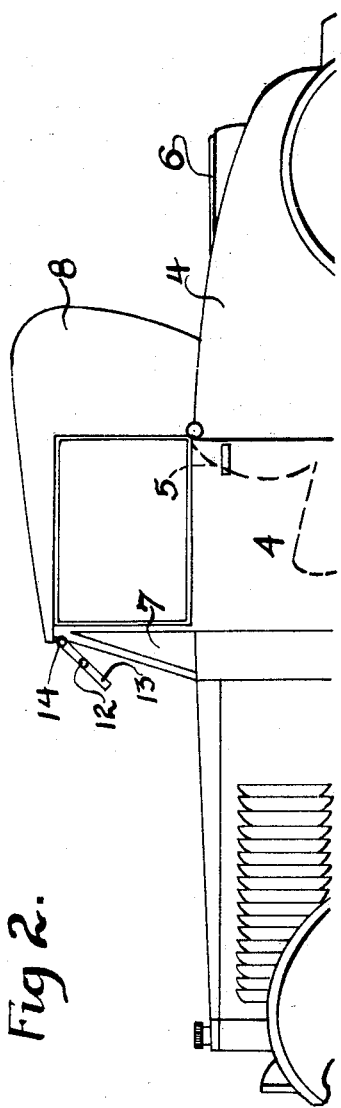
Inventor.
Francis McCahill
Francis T. McCahill

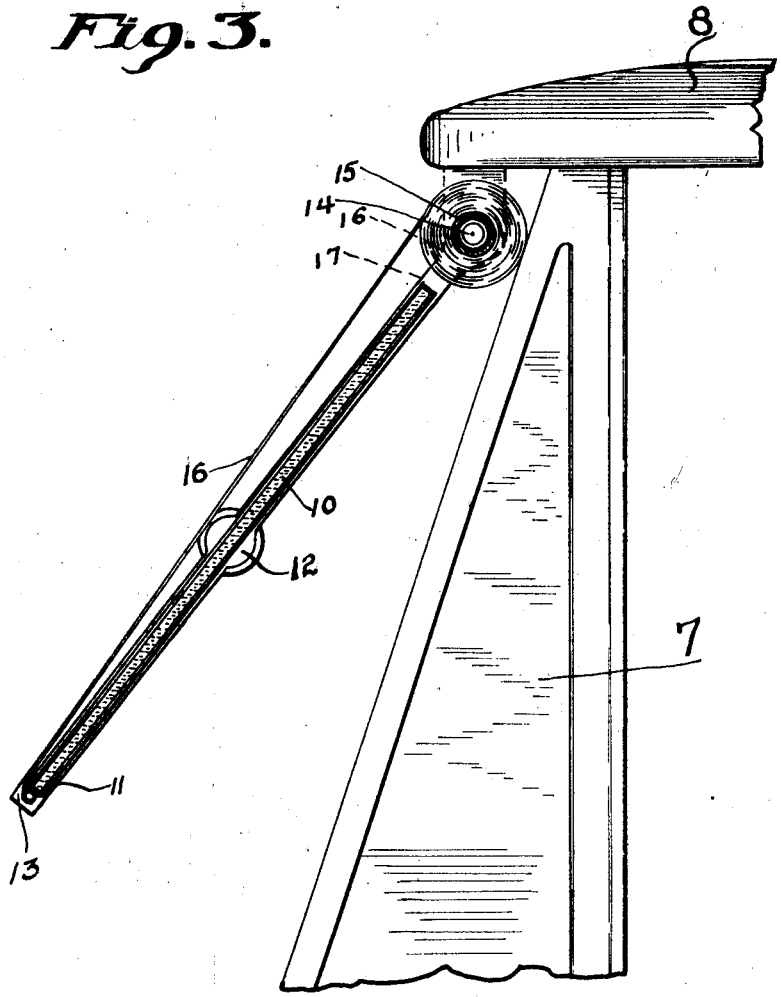

Patented Feb. 5, 1929.

1,701,383

UNITED STATES PATENT OFFICE.

FRANCIS T. McCAHILL, OF MINNEAPOLIS, MINNESOTA.

CONVERTIBLE GLARE AND AUXILIARY WINDSHIELD.

Continuation of application, Serial No. 124,373, filed July 28, 1926. This application filed January 24, 1927. Serial No. 168,087.

This invention relates to improvements in windshields adapted for utilization on automobiles of the roadster type, and, specifically, to protectors of this character which are so mounted as to operate, in one position, as a windshield for the rear seat, and, in another position, as a glare shield shading the front seat.

In the roadster type of automobiles it is customary to so pivotally mount a collapsible top for the front seat that the raised top will cover said seat and, when lowered, the top will extend backwardly towards the rear seat.

The primary object of the invention is the provision of a windshield so mounted as to be automatically positioned to function as a glare shield for the front seat when the top is elevated, and as a windshield for the rear seat when the top is lowered.

Other objects of the invention will be made apparent in the following specifications, when read in connection with the drawings forming a part thereof.

This application is filed as a continuation of or in substitution for my co-pending application, Ser. No. 124,373, filed July 23, 1926, allowed Dec. 10, 1926.

In the drawings:

Fig. 1 is a side elevation of an automobile of the roadster type having a front seat, a rear seat, and a top to which the shield is attached; said top is shown down, the shield operating as a protector for the rear seat.

Fig. 2 is a fragmentary view of the parts shown in Fig. 1 with the top in the raised position. In this position the shield serves as a glare protector for the front seat.

Fig. 3 is an enlarged fragmentary detail view partly in side elevation, and partly in longitudinal central section, showing the shield as in Fig. 2, functioning as a glare shield.

Now referring specifically to the drawings, in which like reference numerals indicate like parts throughout the several views:

My invention is shown as applied to an automobile of the roadster type indicated as an entirety by the numeral 4, and equipped with a front seat 5, rumble seat 6, main windshield 7, top 8, mounted at 9 for pivotal movement between the seats 5 and 6 and, when raised, secured to the main windshield 7. The parts thus far described are standard, and are well understood by those familiar with automobile construction.

A convertible glare and auxiliary windshield 10 is secured to the front edge of the top 8, and slants forwardly and downwardly as shown in Figs. 2 and 3. The shield is made of transparent glass mounted in a frame 11, the ends of the shield 10 being pivoted at 12 to a pair of arms 13, which are in turn pivoted at 14 to the front end of the top 8, for vertical swinging movement. The shield 10 is supported by the arms 13 for angular movement in front of the main shield 7 and for reverse movements so that either face of shield 10 may be turned to the front.

A spring-actuated roller 15 is journaled in axial alignment with the pivots 14, and has mounted thereon an opaque curtain 16, the outer or free end of which is attached at 17 to one of the transverse members of the frame 11. By reference to Fig. 3 it will be noted that the curtain 16, in its full line position, affords a cover for the transparent shield 10. To remove the curtain 16 from the shield 10 it is only necessary to reverse said shield and thereby cause the roller 15 to wind said curtain thereon as indicated by broken lines in Fig. 3.

When the top 8 is down or folded, as shown in Fig. 1, the arms 13 are turned upward in rearwardly inclined positions and support the shield 10 in a position in which it serves as an auxiliary windshield for an occupant of rumble seat 6. When the shield 10 is serving as an auxiliary windshield the curtain 16 is wound onto the roller 15 so that an occupant of the rumble seat 6 may see through said shield.

The curtain 16 is wound on its roller 15 when the top 8 is down, thus leaving the auxiliary windshield clear so that the occupant of the rumble seat 6 may see through the same. When the top 8 is up, the arms 13 may be angularly adjusted to hold the shield 10 at the desired angle to serve as a glare shield, and in this use of said shield, the same is of course reversed from its position shown in Fig. 1, by pulling the curtain 16 from its roller 15 and over said shield, thereby converting the protector 10 into a glare shield for the front seat.

In some instances it might be desired to dispense with the curtain 16 and its roller 15 and form the shield 10 from a translucent material such as amber glass. As previously stated, the arms 13 may be pivotally moved to angularly adjust the shield 10 in front of the main windshield 7. Said arms 13 may also be angularly adjusted to set the shield 10 in any desired position when used as an auxiliary windshield for the rear seat 6. When the top 8 is down, the shield 10, serving as an auxiliary windshield, of course protects an occupant of the rear seat 5 against a driving wind in the direction of travel of the vehicle.

Modifications of the structure herein described may be suggested to those skilled in the art, but my invention covers all embodiments falling fairly within the scope of the appended claim.

What I claim is:

A vehicle having tandem seats, a top foldable between said seats and a shield mounted on the forward end of said top and operating as a windshield for a rear seat when the top is folded.

In testimony whereof I affix my signature.

FRANCIS T. McCAHILL.